April 14, 1970 R. T. MANCINI 3,505,977
RODENT FEEDER

Filed May 16, 1967 2 Sheets-Sheet 1

INVENTOR
RALPH T. MANCINI
BY Besser Smith Hardy
ATTORNEYS

April 14, 1970 — R. T. MANCINI — 3,505,977
RODENT FEEDER
Filed May 16, 1967 — 2 Sheets-Sheet 2

INVENTOR
RALPH T. MANCINI
BY *Besser Smith & Harding*
ATTORNEYS

United States Patent Office 3,505,977
Patented Apr. 14, 1970

3,505,977
RODENT FEEDER
Ralph T. Mancini, Philadelphia, Pa., assignor to Smith Kline & French Laboratories, Philadelphia, Pa., a corporation of Pennsylvania
Filed May 16, 1967, Ser. No. 638,974
Int. Cl. A01k 5/00
U.S. Cl. 119—61                                    1 Claim

ABSTRACT OF THE DISCLOSURE

A rodent feeder has an upwardly extending body with an open top and restricted openings intermediate the top and bottom to restrict the entry of the rodent. A feed trough within the body and below the restricted openings is provided with an overlying disc having openings providing limited access to the feed. A central obstruction within the body may be employed to restrict the entry of rodents into the body.

BACKGROUND OF THE INVENTION

This invention relates to the field of feeding laboratory animals used for experimental purposes. With such animals it is frequently desired to have an accurate measure of food consumed by the animal, in this case a rodent, over a period of time.

There has been little development in the art of rodent feeders for laboratory animals. Levine Patent 1,741,194 discloses such a structure wherein there is provided a horizontal plate having a restricted opening to restrict the entry of the animal into the feeder.

SUMMARY OF THE INVENTION

The rodent feeder of the invention comprises a body having an open top. An opening in the body wall intermediate the top and bottom of the body restricts the entry of the rodent's body. A feed trough mounted within the body with its upper end below the restricted opening is covered by a disc which has a plurality of openings providing limited access to the feed. Where small rodents such as mice are involved, a central obstruction is provided extending upwardly past the restricted opening. Advantageously the feed trough is slideably mounted within the body so that it can be removed through the top of the body or the body can be lifted off the trough.

The invention is highly advantageous in that it prevents the contamination of the food by the rodent's urine or fecal material which, if present, prevents an accurate determination by weighing of the amount of food consumed by the rodent. It will be noted, for example, that this result is not achieved by the device of Levine as disclosed in his Patent 1,741,194. Further, the invention prevents the rodent from rooting food from the feeder. It is simple in design, inexpensive to manufacture and easy to clean.

PREFERRED EMBODIMENTS

Figure 1:
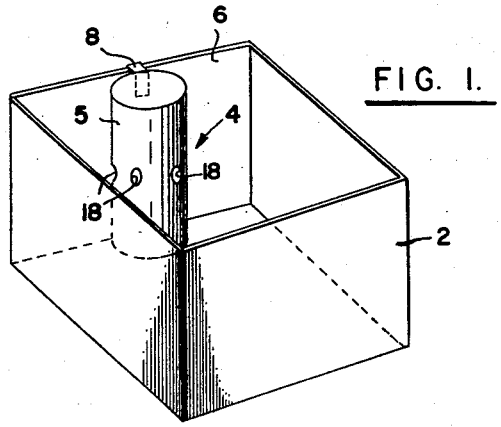
FIGURE 1 is a front perspective view of a rodent box containing a feeder in accordance with the invention.
Figure 4:
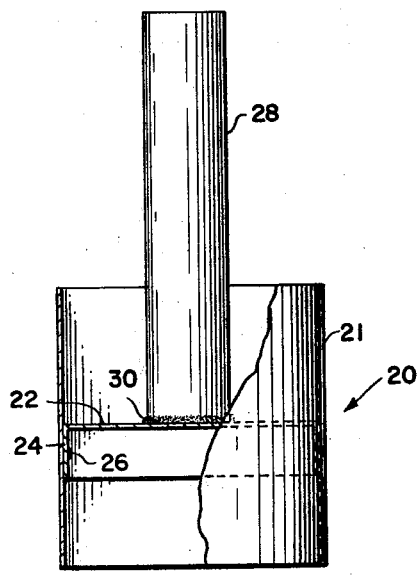
FIGURE 4 is an elevation, partially broken away, of the feeding trough and associated obstruction element of the feeder shown in FIGURE 1.
Figure 3:
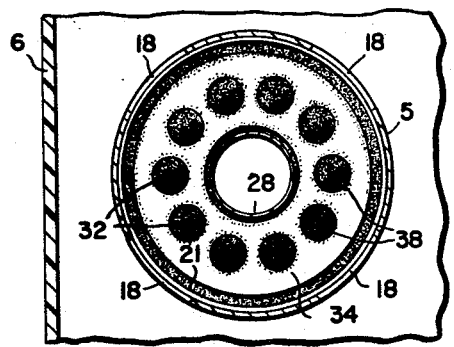
FIGURE 3 is a horizontal section taken on the plane indicated by the line 3—3 in FIGURE 2.
Figure 5:
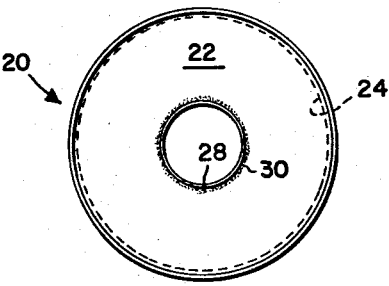
FIGURE 5 is a top plan view of the trough of FIGURE 4.

Referring first to FIGURE 1, a box 2 for containing a mouse has mounted therein a feeder 4 in accordance with the invention. Feeder 4 has a cylindrical wall 5 and is secured to a wall 6 of box 2 by means of a clamp 8. Clamp 8 has a depending member 10 fixedly secured to wall 5 by spot welding as indicated at 12 and has a pair of clamping fingers 14 and 16 which engage opposite sides of wall 5. Equally spaced openings 18 are provided in wall 5 to give a mouse 19 access to the interior of the feeder 4. The diameter of each opening 18 is selected to permit the entrance of the rodent's head and neck, and prevent the entrance of the rodent's hind quarters. A diameter of about ⅝" to about ⅞" is preferred. The height of openings 18 is selected to permit the mouse to put his front paws in the bottom of the opening.

A feed trough 20 has a cylindrical wall 21 which is adapted to slide into the interior of cylindrical wall 5 through the upper open end of the feeder and is adapted to rest on the box bottom. A horizontal base plate 22 has a depending peripheral flange 24 which is secured to wall 21 by, for example, spot welding, as shown at 26.

A cylindrical obstruction member 28 is secured as by brazing indicated at 30 in the center of plate 22 and extends upwardly above restricted openings 18. The diameter of obstruction 28 advantageously is selected to place the obstruction a distance from the restricted openings 18 to permit only the head and neck of the rodent to enter in a horizontal direction before the rodent touches the obstruction. The obstruction prevents a small rodent such as a mouse from entering to a position where it becomes stuck in the opening. About ⅝" is the preferred outer diameter of member 28 with a preferred inner diameter of about 2" for wall 5. This member also may serve as a handle.

The desired feed 32, normally finely powdered, is placed on plate 22 and is contained between wall 21 and obstruction 28. A disc 34 having an opening 38 to permit its fitting around obstruction 28 is adapted to rest on the feed 32 to control the rooting of the feed by the rodent with its paws should the rodent enter far enough to use its paws. To this end disc 34 is provided with a plurality of openings 38 which are only large enough to permit the withdrawal of food by the rodent's tongue.

Figure 2:
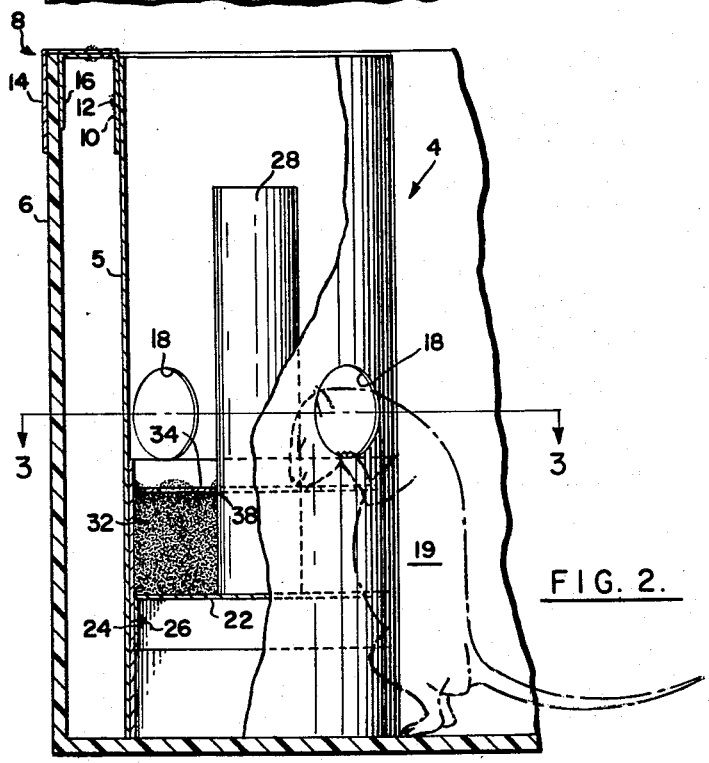
FIGURE 2 is a vertical section, partially broken away, through the feeder and box of FIGURE 1.
Figure 6:
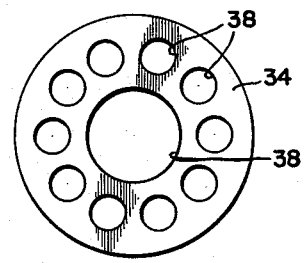
FIGURE 6 is a top plan view of the trough disc of the feeder shown in FIGURE 1.

In operation, a weighed amount of feed 32 is placed in trough 20 and disc 34 is placed on top of the feed. The trough 20 is then slideably entered through the top of feeder 4 to a position below restricted openings 18 and, in the case shown in FIGURE 2 with its bottom resting upon box 2. The mouse in box 2, from time to time, enters through one of the openings 18 and after a short horizontal travel is forced to move its head downwardly. The mouse's tongue withdraws the feed from one of the openings 38 in disc 34. As it becomes difficult to get the feed through the use of a particular opening 18 and the associated adjacent openings 38 in disc 34, the mouse will go to a different opening 18 and the closely associated openings 38 in disc 34 or the mouse will rotate disc 34 which levels out the feed and makes more feed available to him at the same location. This procedure is repeated from time to time until the predetermined time periods has passed at which time trough 20 and feeder 4 are separated and the amount of remaining feed weighed in order to determine the amount of feed consumed. It will be seen that the design is such that all of the food which is not consumed by the mouse will remain in trough 20 and none of the urine or fecal material of the mouse will get into trough 20.

Figure 7:
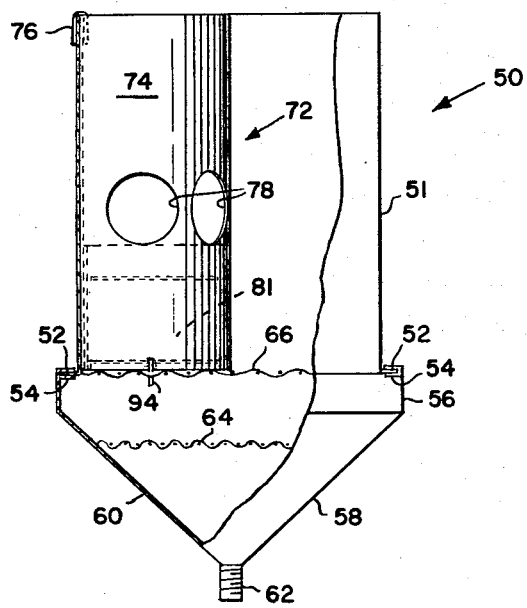
FIGURE 7 is a side elevation, partially broken away, of a modified feeder in accordance with the invention in a rodent house.
Figure 10:
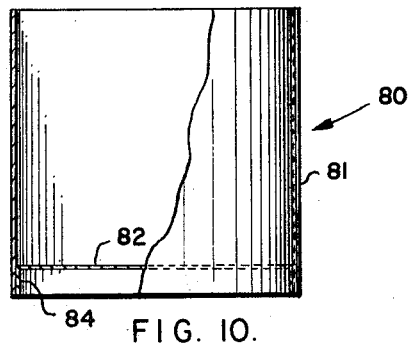
FIGURE 10 is an elevation, partially broken away, of the trough of the feeder shown in FIGURE 7.
Figure 11:
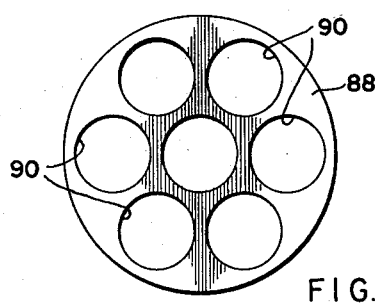
FIGURE 11 is a top plan view of the disc employed with the trough of FIGURE 10.
Figure 8:
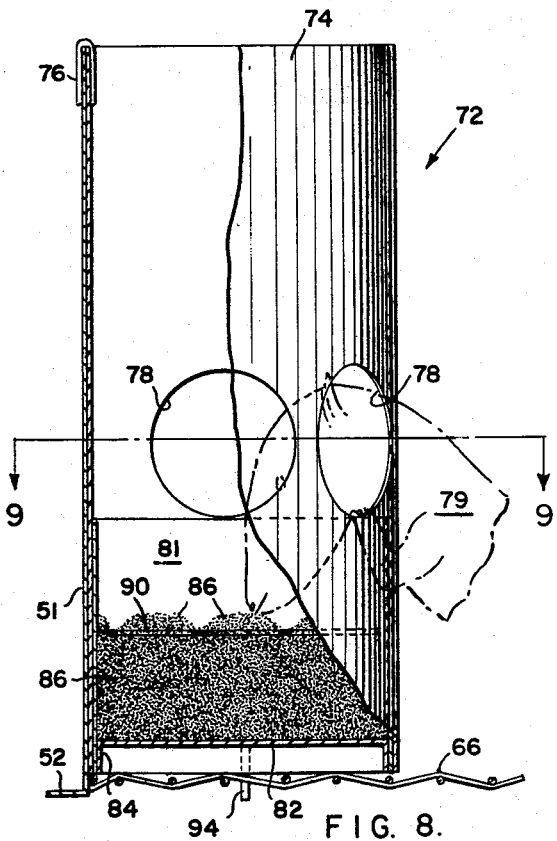
FIGURE 8 is an enlarged view, partially broken away, of the feeder shown in FIGURE 7.
Figure 9:
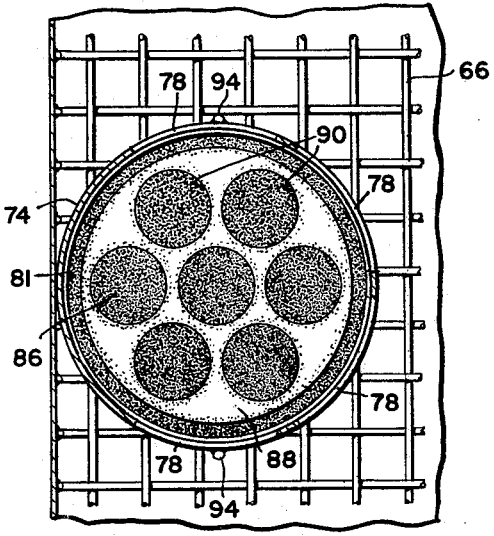
FIGURE 9 is a horizontal section taken on the plane indicated by the line 9—9 in FIGURE 8.

An alternative embodiment is shown in FIGURES 7 through 11. Referring first to FIGURE 7, a rat container 50 has a rectangular wall 51 having a pair of opposed lower flanges 52, 52 which are engaged U-shaped track members 54, 54 to slideably secure a catch basin 56 below box 50. Catch basin 56 has opposed sloping walls 58 and 60 which slope downwardly to a discharge pipe 62. A refuse screen 64 is mounted intermediate the top and bottom of catch basin 56. An animal supporting screen 66 is secured to the lower end of rectangular wall 51. The thus described structure is conventional.

A feeder 72, in accordance with the invention, has a cylindrical wall 74 which is secured to wall 51 by a removeable clip 76. Spaced restricted openings 78 are provided intermediate the top and bottom of wall 74. The diameter of each opening 78 is selected to prevent the hind quarters only of a rat 79 from entering into the interior of feeder 72. The diameter of wall 74 is selected to limit the rat from entering more than his head and neck horizontally thus eliminating the necessity for a central obstruction.

A feed trough 80 has a cylindrical wall 81 which is adapted to slideably fit within wall 74 in frictional engagement so that the trough 80 will remain in any preset position. A base plate 82 having a peripheral depending flange 84 is secured by a pressed fit inside wall 81. Feed 86 is loaded inside of trough 80 and there is provided a disc 88 which is adapted to rest on the feed 86. Disc 88 has restricted openings 90 which are selected in size to be just big enough for the rat to use his tongue to pick up food and thus prevent rooting.

For additional stability a pin 94 secured to wall 74 extends downwardly through an opening in screen 66.

It is believed clear that the operation of the alternative embodiment will be obvious from the above description and the description of the operation of the first described embodiment.

The above described embodiments are by way of illustration and are not intended to be limiting.

I claim:
1. A rodent feeder comprising:
   a means forming a body having an inner diameter of about 2", having an open top and having a restricted opening intermediate the top and bottom which is just reachable by a rodent's front paws with the rodent standing on its hind feet and which provides limited entry of the rodent body into the feeder, said restricted opening having a diameter of from about ⅝" to about ⅞",
   a feed trough within said body with its upper end below said opening in said body forming means,
   a disc adapted to overlie feed in said trough and having a plurality of openings providing limited access to the feed and,
   an obstruction member mounted within the body and extending from below the level of the opening in said body forming means to above the level of said opening and limiting the distance the rodent can move inwardly in a horizontal direction through said opening, said obstruction member being cylindrical and having an outer diameter of about ⅝".

References Cited

UNITED STATES PATENTS

| 1,100,927 | 6/1914 | Sutton | 119—61 |
| 1,113,842 | 10/1914 | Sill | 119—52 |
| 1,113,887 | 10/1914 | Dragan et al. | 119—52 X |

FOREIGN PATENTS

| 423,080 | 1/1935 | Great Britain. |

HUGH R. CHAMBLEE, Primary Examiner

U.S. Cl. X.R.

119—63